(12) United States Patent
Fox

(10) Patent No.: US 7,327,559 B2
(45) Date of Patent: Feb. 5, 2008

(54) APPARATUS AND METHOD FOR HEATING THE HANDS OF KEYBOARD USERS

(75) Inventor: Tom Fox, Santa Cruz, CA (US)

(73) Assignee: Sound Starts, Inc., Aromas, CA (US)

( * ) Notice: Subject to any disclaimer, the term of this patent is extended or adjusted under 35 U.S.C. 154(b) by 195 days.

(21) Appl. No.: 11/129,608

(22) Filed: May 13, 2005

(65) Prior Publication Data

US 2006/0256519 A1    Nov. 16, 2006

(51) Int. Cl.
*G06F 1/16* (2006.01)
(52) U.S. Cl. .............. 361/680; 361/683; 219/209; 219/521
(58) Field of Classification Search .......... 361/680, 361/681; 345/168, 169; 219/209, 521
See application file for complete search history.

(56) References Cited

U.S. PATENT DOCUMENTS

| | | | | |
|---|---|---|---|---|
| 5,369,560 A | * | 11/1994 | Friedman | 362/396 |
| 5,497,942 A | * | 3/1996 | Zingle et al. | 239/6 |
| 5,828,034 A | * | 10/1998 | Chang | 219/209 |
| 5,851,106 A | * | 12/1998 | Steiner et al. | 416/63 |
| 6,115,540 A | * | 9/2000 | Klopotek | 392/432 |
| 6,133,556 A | * | 10/2000 | Ramsey et al. | 219/521 |
| 6,646,226 B1 | * | 11/2003 | Reitz | 219/209 |
| 6,799,861 B2 | * | 10/2004 | Naghi et al. | 362/198 |
| 6,878,902 B2 | * | 4/2005 | Lyle et al. | 219/209 |
| 6,909,602 B2 | * | 6/2005 | Dietrich et al. | 361/687 |
| 2001/0048409 A1 | * | 12/2001 | Kim | 345/82 |

FOREIGN PATENT DOCUMENTS

JP    2003-223261    *  8/2003

OTHER PUBLICATIONS

U.S. Appl. No. 60/626,289, Tom Fox.

* cited by examiner

*Primary Examiner*—Lisa Lea-Edmonds
*Assistant Examiner*—Anthony Q Edwards
(74) *Attorney, Agent, or Firm*—Central Coast Patent Agency, Inc.

(57) ABSTRACT

A computer keyboard has a chassis, internal components and keys, at least one heating element positioned in an opening into the chassis, and at least one fan positioned to urge air over the heating element and into the chassis. Air entering the chassis over the heating element is urged upward through the chassis and around the keys into a region above the keys.

3 Claims, 6 Drawing Sheets

APPARATUS AND METHOD FOR HEATING THE HANDS OF KEYBOARD USERS

CROSS-REFERENCE TO RELATED APPLICATIONS (Not applicable)

BACKGROUND OF THE INVENTION

1. Field of the Invention

The present invention is in the field of computer elements and components, and pertains more particularly to such as keyboards.

2. Discussion of the State of the Art

In the computer arts there continues to be a motivation for increased operability, efficiency, and comfort for the computer system user. The computer keyboard is one the most elemental and essential components of a computer system. The keyboard operates by translating key presses into computer recognized codes that generate the corresponding character or operation, providing an effective means of data input, control and operation for the system.

Many computer users spend several hours per day operating keyboards, both in the workplace and home. With the increased spread of computer use and technology into all areas of our lives, there is an increased demand for keyboard type input devices that not only work well with a computer, but which also work well with the human operator. Examples of this can be seen in the continued development of the pointer device called a mouse. The recent ergonomically-developed mouse is shaped to encourage hand comfort decreasing the finger and wrist movements.

The ability of a user to achieve a productive session using a computer system requires that the user be comfortable in a user-friendly setting. Often computing devices are used in chilly environments and even outdoors causing the user to endure colds hands and fingers. Long periods of immobility for users sitting stationary and operating computers also can cause poor circulation which causes cold hands and fingers.

According to recent scientific studies and as commonly known by computer keyboard users, cold wrists, hands and fingers slow productivity. When wrists, hands and fingers get cold they slow down. More errors occur and finger flexibility suffers. Often wrists, hands and fingers will be painful, especially if the user suffers from arthritis, repetitive stress injury or carpal tunnel syndrome.

What is needed in the art, and provided for the first time here, is an apparatus and method for heating the hands of keyboard users to maintain wrists, hands and fingers at a comfortable temperature, enabling the user to practice prolonged keyboard use in a productive and pain-free manner, either indoors or out.

SUMMARY OF THE INVENTION

In one embodiment of the present invention a computer keyboard is provided, comprising a chassis, internal components and keys, at least one heating element positioned in an opening into the chassis, and at least one fan positioned to urge air over the heating element and into the chassis. Air entering the chassis over the heating element is urged upward through the chassis and around the keys into a region above the keys.

In one embodiment the heating element and fan are positioned on the bottom of the chassis. Also in one embodiment the heating element and fan operate from power provided to the keyboard from a connected computer. In another embodiment the heating element and fan have a separate power source from the keyboard input device. In some embodiments there may be two or more heating elements and adjacent fans in separate openings in the chassis.

In another aspect of the invention a computer keyboard is provided comprising a chassis, internal components and keys, and at least one heating element intimately joined to the chassis. A portion of the heat provided by the at least one heating element is conducted through the chassis and radiated to space above the keyboard keys. There may be in some embodiments two or more heating elements intimately joined to the chassis.

In yet another aspect of the invention a portable computer is provided, comprising a chassis, internal computer components and keys, at least one heating element positioned in an opening into the chassis, and at least one fan positioned to urge air over the heating element and into the chassis. Air entering the chassis over the heating element is urged upward through the chassis and around the keys of the keyboard into a region above the keys. In some embodiments there may be two or more heating elements and adjacent fans in separate openings in the chassis.

In other embodiments a portable computer is provided, comprising a chassis, internal computer components and keys, and at least one heating element intimately joined to the chassis. A portion of the heat provided by the at least one heating element is conducted through the chassis and radiated to space above the keyboard keys. There may be two or more heating elements intimately joined to the chassis.

In yet another aspect of the invention a computer keyboard heating apparatus is provided comprising a chassis, one or more heating elements, one or more fans positioned to urge air over the heating element and away from the apparatus, and a physical interface for attaching the heating apparatus to a keyboard in a position that the fan will urge warm air into a region above the keys of the keyboard. In some embodiments there is additionally at least one directional component for directing warmed air at different angles over the keyboard.

In yet another aspect of the invention a method for providing a flow of warm air to the hands of a computer keyboard user is provided, comprising the steps of (a) incorporating at least one heating element in an opening into a chassis of the keyboard; (b) providing at least one fan unit positioned to urge air over the heating element and into the chassis; and (c) operating the fan and heating element to urge warm air up and through the keyboard around the keys, into a region where a user's hands operate the keys.

In yet another embodiment a method for providing warm air to the hands of a computer keyboard user is provided, comprising the steps of (a) incorporating at least one heating element intimately joined to a chassis of the keyboard; and (b) operating the heating element to warm the chassis, to conduct heat through the chassis and radiate at least a portion of the into a region above the keys.

BRIEF DESCRIPTION OF THE DRAWING FIGURES

DETAILED DESCRIPTION

Computer input using keyboards is a fundamental operation for all operators of computers. It is important to eliminate production barriers and emphasize comfort for computer operators. Although it may seem inconsequential to some, cold hands, fingers and wrists slow a keyboard user's ability to accurately and efficiently enter data. Offices where a majority of computer user's work are often underheated and overly air conditioned as a requirement for computer hardware stability. Cold muscles and tendons are at a much greater risk for overuse injuries, such as repetitive strain injury (RSI), carpal tunnel syndrome and tendonitis, to name a few. Computer operators who currently have some of these medical problems experience increased suffering when forced to work when hands and fingers are cold.

The present invention provides heating apparatus and methods which may be utilized to aftermarket keyboards or integrally manufactured into the keyboard.

Figure 1:
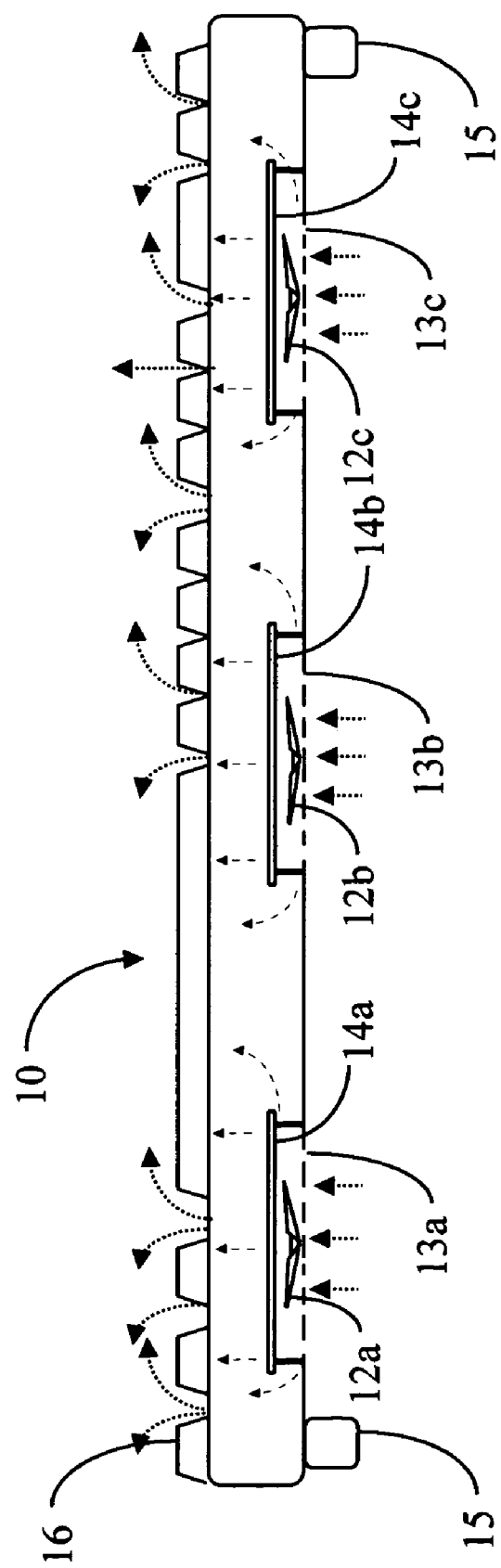
FIG. 1 is an elevation view of a keyboard heating device demonstrating a convection method of heating according to an embodiment of the present invention.

FIG. 1 shows one embodiment of the invention wherein a keyboard 10 is a stand-alone device connected to a computer system (not shown) by means of a cable and appropriate type of connector or by a wireless or cordless component (not shown) as is known in the art. The keyboard mode of manufacture is common to the art wherein the chassis holding the electronic board and individual keys is an open layered construction easily allowing air passage over and through the hardware components.

As indicated by dotted line arrows in FIG. 1, air is drawn into the body of the keyboard in this embodiment via fans 12a, 12b and 12c and passes through or over heating elements 14a, 14b and 14c. As the air, forced by the fans 12a, 12b and 12c, passes over the heating elements 14a, 14b and 14c the air becomes warmed. By means of the standard internal design of the keyboard 10, the heated air is conducted to multiple areas of the keyboard 10 where it can pass up and around keys 16 to produce a zone of heated air in the area above the keyboard, and this is the region where the user places his/her hands to operate the keyboard.

A keyboard such as keyboard 10 is spaced apart from the surface it rests upon by feet 15 positioned on the underside of keyboard 10 on opposite ends of the keyboard. Feet 15 are of adequate height dimension to provide space under the keyboard for ample airflow to fans 12a-c. Vent openings 13a-c allow air to enter the keyboard chassis to be drawn over heating devices 14a-c and dispersed upwards through and around the internal components and out above the keys 16 by fans 12a-c.

Heating elements 14a-c and fans 12a-c may have a separate, direct power connection to an outside power source (not shown), or the components may be powered via the power connection to the computer via a step-up power converter, as known in the art. In this manner the additional heating elements of the keyboard can operate from the connected computer power without requiring an additional outside power source.

Figure 2:
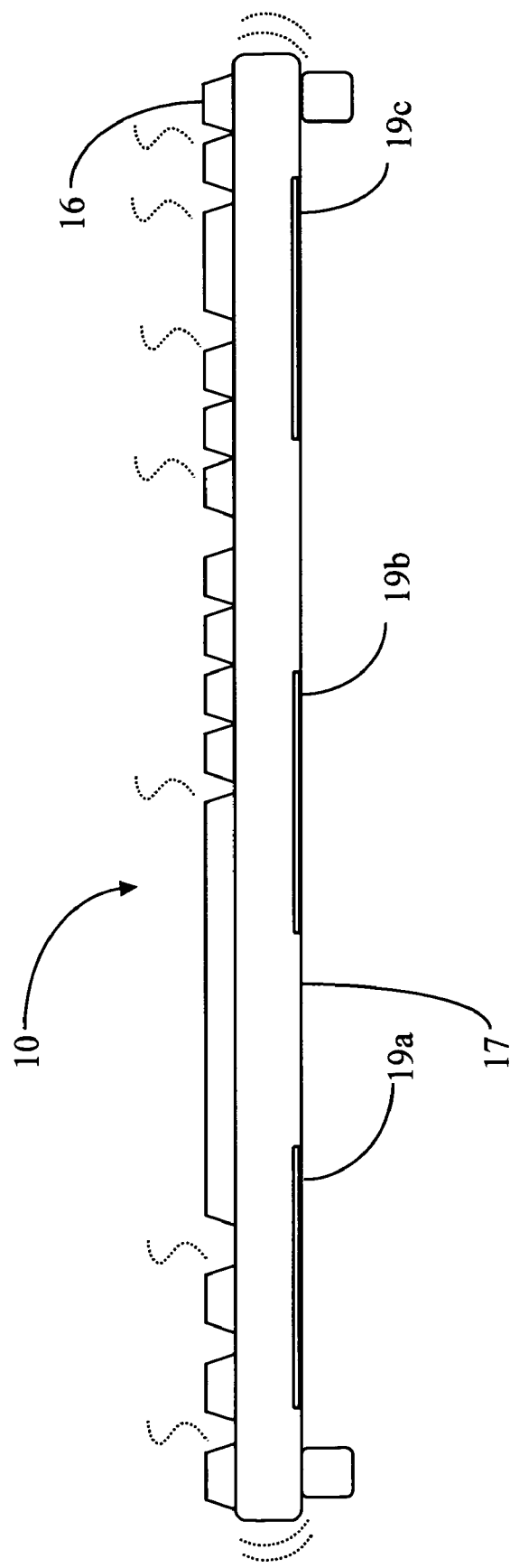
FIG. 2 is an elevation view of a keyboard heating device demonstrating a radiant method of heating according to an embodiment of the invention.

FIG. 2 illustrates a radiant heating method of providing warmth to the hands and fingers of an operator of the keyboard 10. Keyboard chassis 17 may be manufactured of a heat-conductive material, preferably a light weight metal which easily conducts heat, for example, aluminum, or may be made of the conventional plastic materials typically used for keyboards. Heating elements 19a-c are directly mounted on chassis 17 to enable surface-to-surface contact between chassis 17 and heating elements 19a-c.

As a result of providing power to heating elements 19a-c, the elements provide heat to the adjoining chassis 17 which conducts the heat to other portions of the chassis, and radiates the heat from the chassis to the region above the keyboard, providing warmth to the touch of the keyboard user. The heated chassis 17 provides a zone of heated air in the immediate vicinity of the chassis thereby providing a zone of warm air as demonstrated by the dotted line indicia, which is in the area of the user's hands when operating the keyboard.

Figure 3:
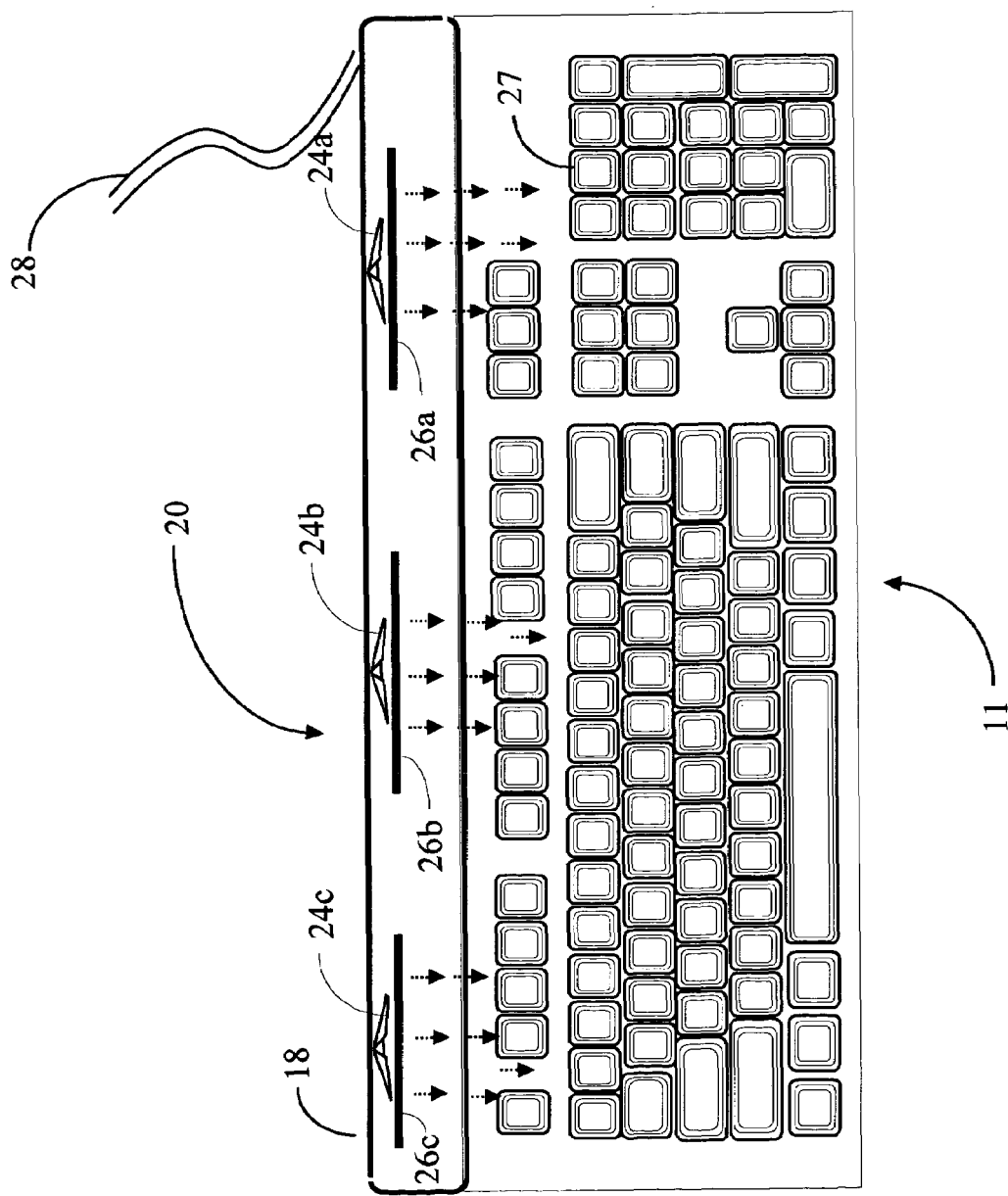
FIG. 3 illustrates an aftermarket keyboard heating device according to an embodiment of the invention.

FIG. 3 illustrates an embodiment wherein a keyboard heating device 20 is attached to a standard keyboard 11. Heating elements 26a-c and fans 24a-c are mounted in a housing 18. Housing 18 is an aftermarket device capable of attaching to keyboard 11 utilizing clamping methods, adjustable thumb screws (not shown) or other fastening means known in the art. Keyboard heating device 20 may also be manufactured in a way to provide a docking port for aftermarket keyboards, wherein in addition to providing heated air, lighting, aromatherapy, or other services may be incorporated. Aromatic material (not shown) could be inserted in a well adjacent to heating elements 26a-c on the opposite side of fans 24 a-c. Directional lighting (not shown) may also be installed in heating device 20 to provide direct lighting and additional warmth in a zone in the immediate area of keys 26.

FIG. 3 shows heating device 20 attached to the far top side of the keyboard directing air towards the user, just above keys 27 as indicated by dotted arrow lines. Heating device 20 in this embodiment includes a separate power cord 28 from the keyboard to provide power to the electrical components of the device. Heating device 20 may also include temperature control and means for adjusting fan speed.

Figure 4:
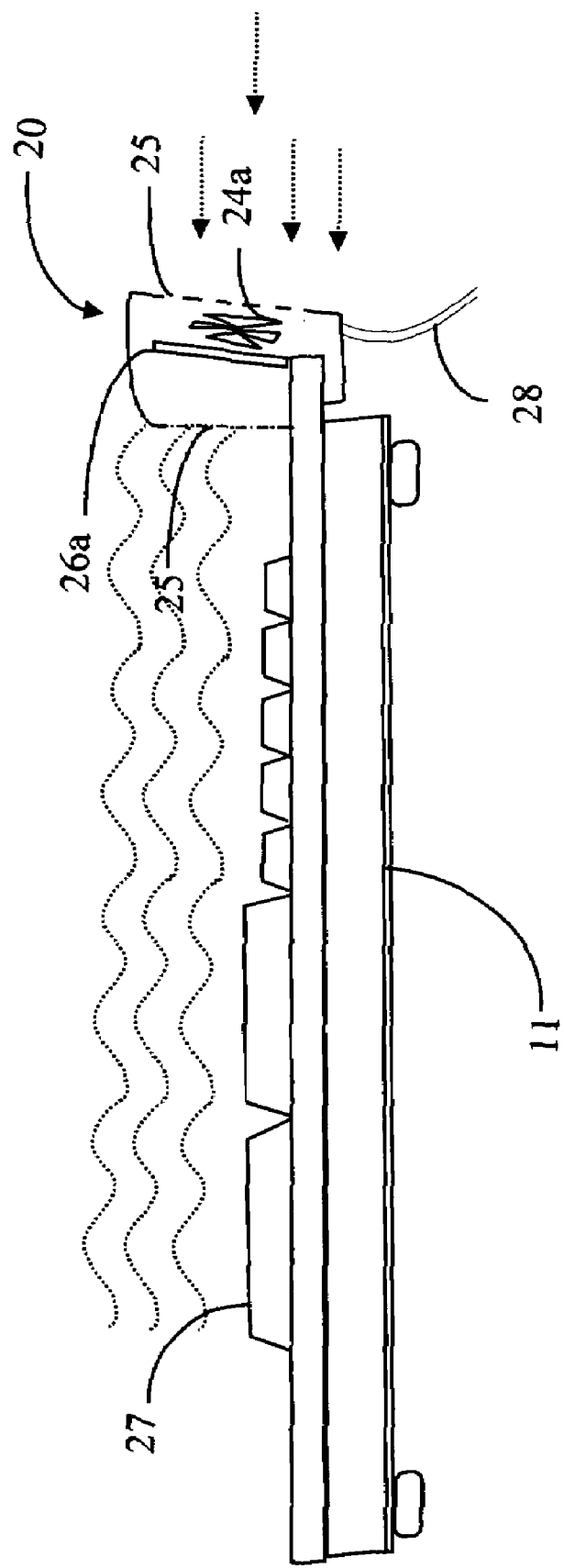
FIG. 4 is a side view of the aftermarket keyboard heating device of FIG. 3.

FIG. 4 is a side cutaway view of heating device 20 of FIG. 3. As can be seen here, the heating device 20 is attached to keyboard 11 in a manner to provide an adequate angle of airflow over keys 28 providing warmth to the hands and fingers of a keyboard user. In one embodiment heating device 20 is adjustable to alter the angle of airflow to accommodate various users. Cutaways 25 are strategically placed in the back and front portions of chassis 18 in order for fan 24a, in this example to pull air from outside chassis 18, around and over heating element 26a and out of chassis 18 over keys 27 creating a zone of heated air above keys 27 thereby warming the hands and fingers of a user of keyboard 11 as shown by dotted arrows and indicia.

Figure 5:
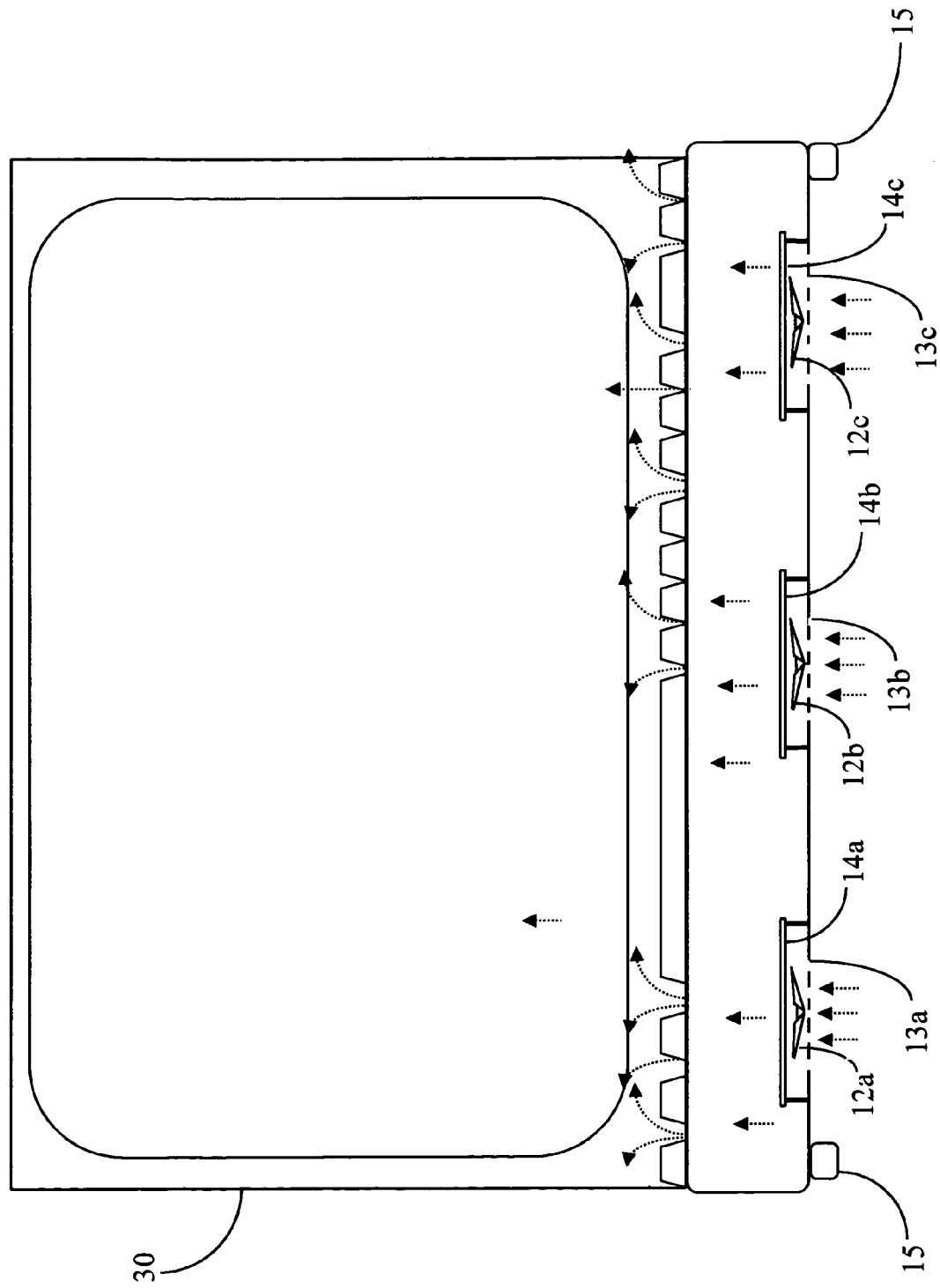
FIG. 5 is a front view of a laptop computer illustrating another keyboard heating method according to an embodiment of the invention.

FIG. 5 illustrates another embodiment of the invention wherein the keyboard heating elements of FIG. 1 are integrated into a portable or laptop computer 30. Here the bottom surface of the portable computer 30 is spaced apart from the surface it rests upon by feet 15. Feet 15 are of a specific height to allow adequate air flow beneath the portable computer 30 to facilitate the invention. Cutaways 13a-c in the bottom of portable computer 30 allow air to be drawn in via fans 12a-c which pass over heating elements 14a-c which in turn warm the air. By means of the internal design of the portable computer 30, the heated air is routed to multiple areas of portable computer 30 where it can pass up and around the keys to produce a zone of heated air in the area that the user places the hands to operate the device.

Figure 6:
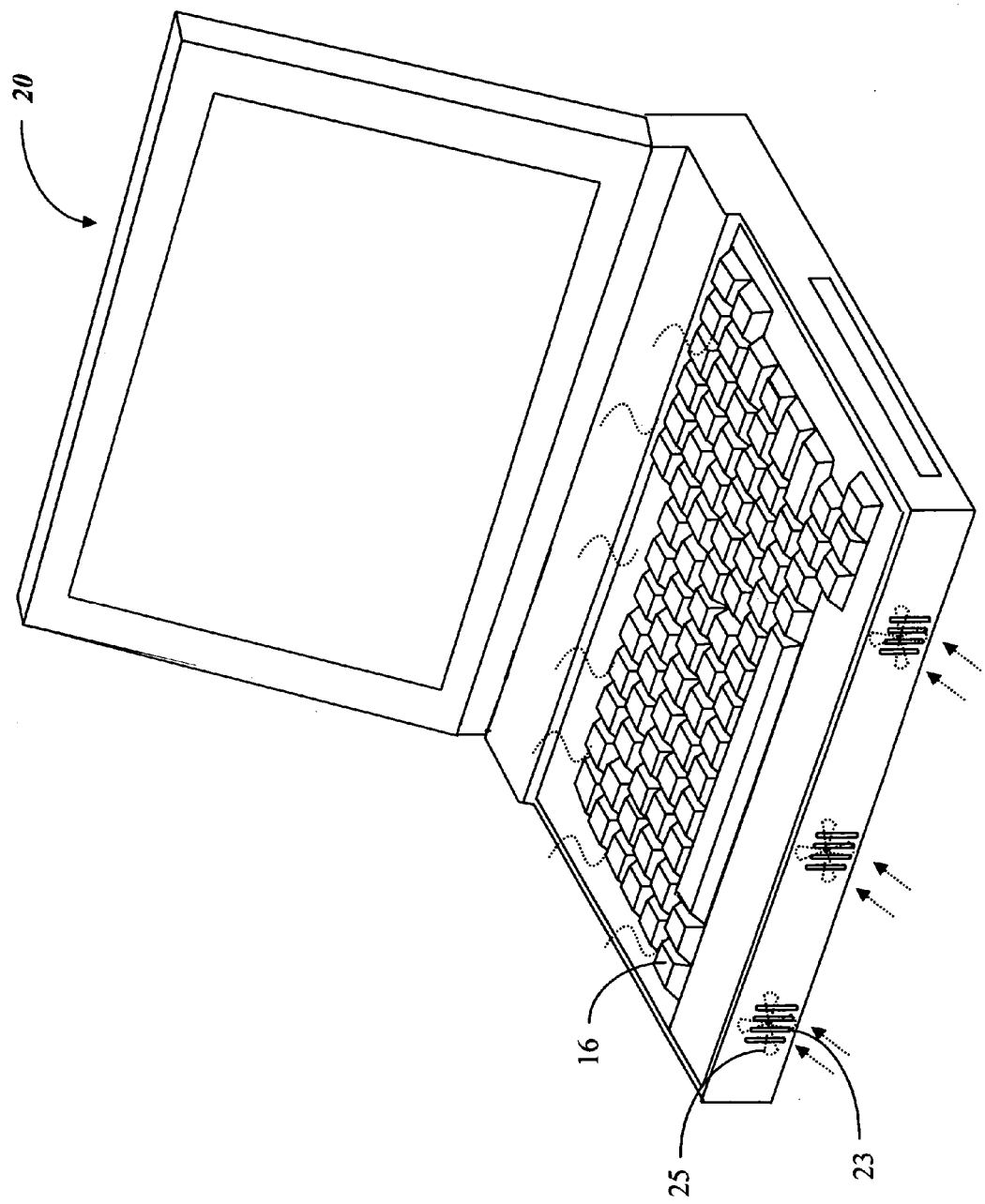
FIG. 6 is a perspective view of the laptop computer of FIG. 5.

FIG. 6 is a side perspective view of portable computer 30 wherein fans 25 are strategically placed in the front side of the portable computer facing the user. Vents 23 provide an opening in the chassis of the portable computer 30 to allow air inflow into the device. In this embodiment heating elements (not shown) may be provided in the path of the air inflow to provide heated air up and through the internal components (not shown) of portable computer 30, out through keys 16. Alternatively, the heating elements might be omitted and the fans might direct the air flow over internal components providing natural heat from operation of portable computer 30. It may at first seem that warmed air passing into and through computer 20 might be detrimental, as it is necessary in many cases to provide such computer devices with airflow to cool internal components, such as the CPU and other devices. The temperature of the air for comfortable operation for a user's hands, however, allows the same air to behave as a coolant for the heat to be dissipated from heat-producing components in the computer, such as the CPU.

The embodiments described above are specific embodiments to serve as examples of practice of the invention, and are not intended to be limiting. The skilled artisan will recognize that many alterations may be made without departing from the spirit and scope of the invention. For example, the same elements as described in above embodiments may be used in environments where there is one or both of high temperature and high humidity. With separate control for fans and heating elements, one might, for example, turn of the heating element or elements and use the fans alone to help keep the user's hands dry and comfortable in a hot, humid environment. There may be many other such alterations within the spirit and scope of the invention.

It must be appreciated, therefore, that, although specific embodiments of the present invention have been described above for purposes of illustration, various modifications may be made without deviating from the spirit and scope of the invention. Accordingly, the invention is not limited by the disclosed embodiments, but, instead, the scope of the invention is determined by the following claims.

What is claimed is:

1. A keyboard comprising;
   a housing for keys of the keyboard, the housing manufactured from a heat-conductive material;
   a plurality of heating elements directly mounted on the housing, enabling surface-to-surface contact between the housing and the heating elements and further comprising temperature control for each one of the plurality of heating elements, independently, thereby controlling heat to areas of the keyboard; and
   a power supply to the heating elements;
   wherein power is applied to the heating elements causing said heating elements to increase in temperature which provides heat to the housing in a housing area which conducts the heat to other areas of the housing, and radiates the heat from the areas of the housing to regions above the keyboard, providing warmth to the touch of a keyboard user, and the heated housing provides a zone of heated air in the immediate vicinity of the housing thereby providing a zone of warm air in the area of the user's hands when operating the keyboard.

2. The keyboard of claim 1 wherein the housing is manufactured from aluminum.

3. The keyboard of claim 1 wherein the housing is manufactured from conventional plastic materials typically used for keyboards.

* * * * *